Patented May 7, 1946

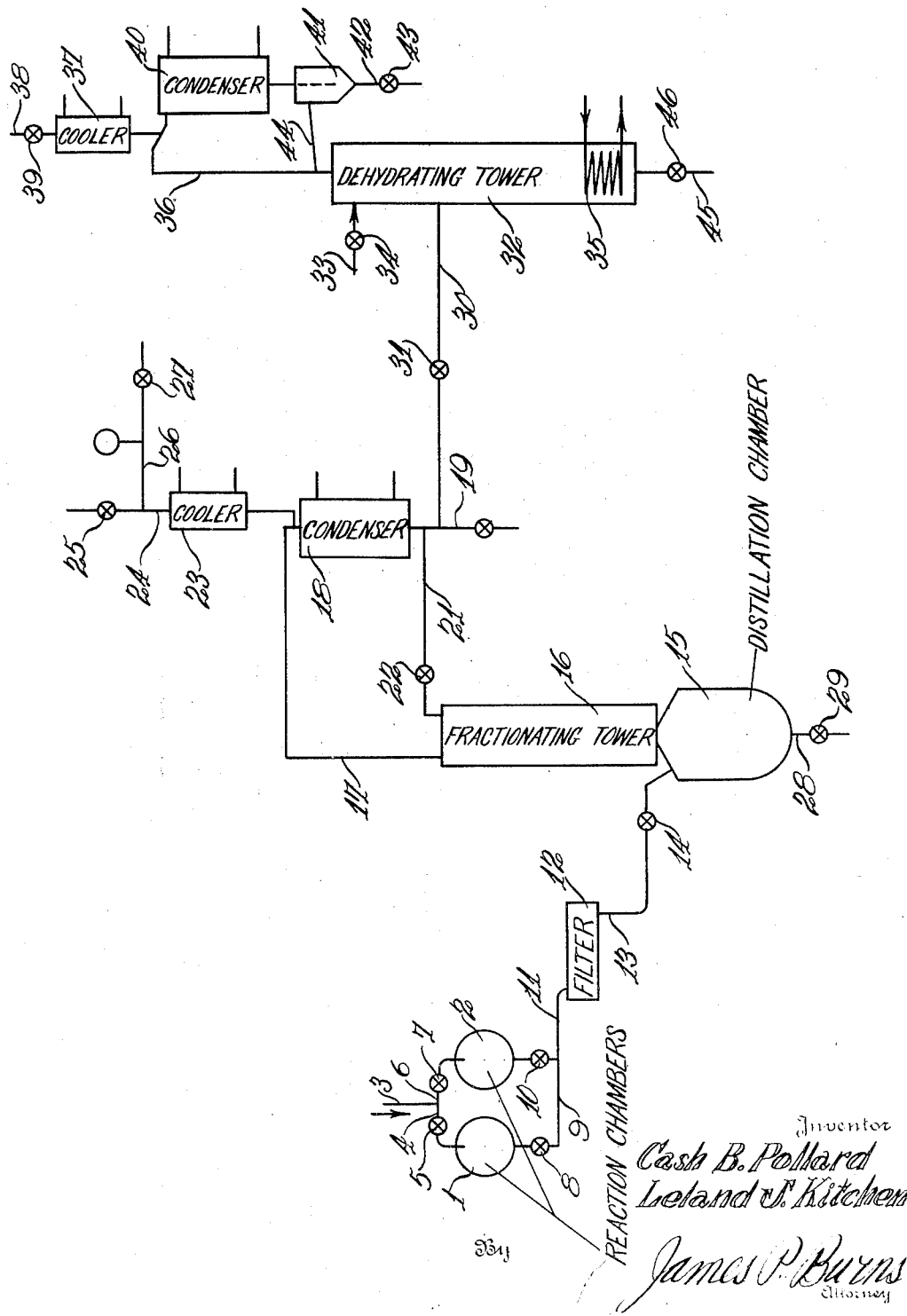

2,400,022

UNITED STATES PATENT OFFICE 2,400,022

PROCESS FOR SYNTHESIZING RING COMPOUNDS

Cash B. Pollard and Leland J. Kitchen, Gainesville, Fla., assignors to the Board of Commissioners of State Institutions, Tallahassee, Fla.

Application July 15, 1942, Serial No. 451,048

4 Claims. (Cl. 260—268)

The present invention relates to a process for synthesizing ring compounds and has particular application to the production of such compounds as piperazine and substituted piperazines.

The invention has for its object the provision of an efficacious process for the preparation of ring compounds such as piperazine and substituted piperazines through the medium of ring closure from economic starting materials whereby such desirable products can be efficiently and economically produced. These products are highly advantageous as intermediates in the production of synthesized compounds, more particularly in the pharmaceutical field, and are particularly useful as intermediates in the production of pyrazin and substituted pyrazins. Piperazine is additionally of special value in the identification of fatty acids in analytical and research work.

The basic reaction of the present invention involves the splitting off of water from compounds of the following general formula:

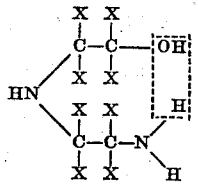

wherein the OH radical is hydroxyl in nature, the terminal NH group is typically amino, and X is selected from the group consisting of hydrogen, alkyl, aryl, aralkyl, and alkaryl.

As applied to the direct preparation of piperazine, the reaction may be exemplified as follows:

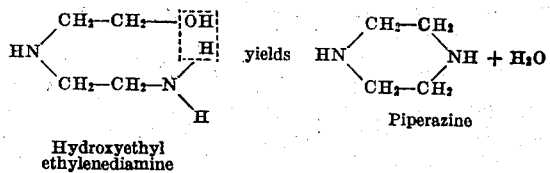

Hydroxyethyl ethylenediamine

Piperazine

The reaction is effected in the presence of a suitable catalyst under conditions which will be more specifically hereinafter pointed out. The basic reaction is the same when producing substituted piperazine and in this instance may be exemplified as follows:

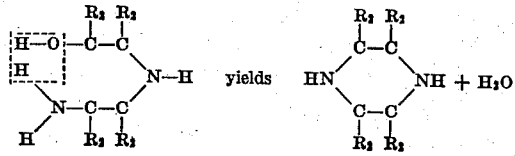

in which R represents hydrogen or an alkyl, aryl, aralkyl, or alkaryl group or groups or any combination thereof. Since the four carbon atoms have eight positions permitting substitution, it is obvious that the number of substituent groups cannot exceed eight.

As above indicated, the source material for the preparation of unsubstituted piperazine is hydroxyethyl ethylenediamine.

The starting materials for the preparation of substituted piperazines are substituted hydroxyethyl ethylenediamines. These amino-alcohols are readily prepared by the reaction of an ethylene oxide or a substituted ethylene oxide with a 1,2-diamine (ethylene diamine or a 1,2-diamine with substituents). Many of these materials are available commercially, such as the following:

(I) Ethylene oxide
(II) Propylene oxide
(III) Isobutylene oxide
(IV) Phenylethylene oxide
(V) Ethylene diamine
(VI) Propylene diamine The following represent reactions by which substituted piperazines may be prepared from the above reactants:

Ethylene oxide plus propylene diamine → the two isomeric 2-hydroxyethyl propylene diamines,

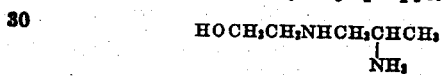

and

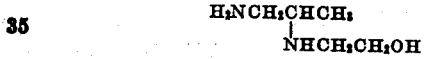

each of which upon ring closure yields 2-methylpiperazine.

Propylene oxide plus ethylene diamine → 2-hydroxypropyl ethylene diamine, which upon ring closure yields 2-methylpiperazine.

Propylene oxide plus propylene diamine → two isomeric 2-hydroxypropyl propylene diamines, which upon ring closure yield a mixture of approximately 50% 2,5-dimethylpiperazine and 50% 2,6-dimethylpiperazine, separable by fractionation.

Isobutylene oxide plus ethylene diamine→N-(2-methyl-2-hydroxypropyl)-ethylene diamine, which upon ring closure yields 2,2-dimethylpiperazine.

Isobutylene oxide plus propylene diamine→two isomeric N-(2-methyl-2-hydroxypropyl)-propylenediamines, which upon ring closure yield a mixture of 2,2,5-trimethylpiperazine and 2,2,6-trimethylpiperazine, separable by fractional distillation.

Phenylethylene oxide plus ethylene diamine→ N-(2-hydroxy-2-phenylethyl)-ethylene diamine, which upon ring closure yields 2-phenylpiperazine.

Phenylethylene oxide plus propylene diamine→ two isomeric N-(2-hydroxy-2-phenylethyl)-propylene diamines, which upon ring closure yield a mixture of 2,2-dimethyl-5-phenylpiperazine and 2,2-dimethyl-6-phenylpiperazine.

A further extensive series of substituted ethylene diamines is available in the nitroparaffin industry. These diamines are produced by the following series of reactions:

Nitroparaffin+chlorine+sodium
    hydroxide→chloronitroparaffin

Chloronitroparaffin+nitroparaffin+sodium
    hydroxide→dinitroparaffin, which on reduction yields the corresponding diaminoparaffin. For example:

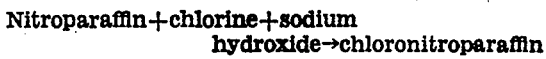

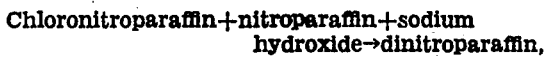

Nitroethane     Sodium salt of nitroethane

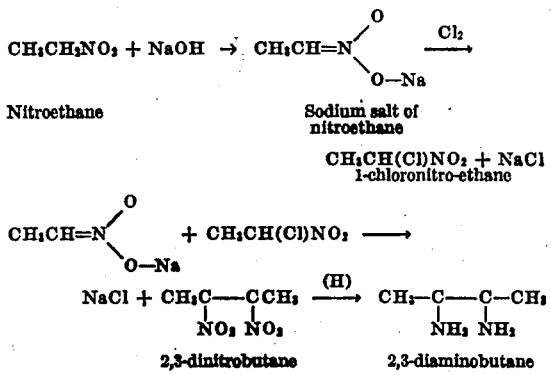

2,3-dinitrobutane     2,3-diaminobutane

Illustrative of the diamines available from the three nitroparaffins (nitroethane, 1-nitropropane, and 2-nitropropane) are the following:

(VII) 2,3-diaminobutane
(VIII) 3,4-diaminohexane
(IX) 2,3-diamino-2,3-dimethylbutane and the three unsymmetrical diamines:

(X) 2,3-diaminopentane
(XI) 2,3-diamino-2-methylpentane
(XII) 2,3-diamino-2-methylbutane In addition, the use of nitromethane with the above mentioned nitroparaffins yields:

(XIII) 1,2-diaminobutane and
(XIV) 2,3-diamino-2-methylpropane

Carrying through the syntheses with ethylene oxide alone, the diamines above identified as VII to XIV yield, respectively, the following substituted piperazines:

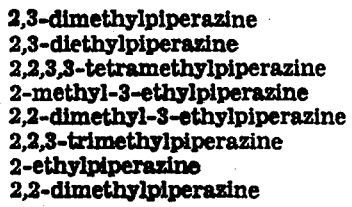

2,3-dimethylpiperazine
2,3-diethylpiperazine
2,2,3,3-tetramethylpiperazine
2-methyl-3-ethylpiperazine
2,2-dimethyl-3-ethylpiperazine
2,2,3-trimethylpiperazine
2-ethylpiperazine
2,2-dimethylpiperazine These ring closures take place under the same conditions under which unsubstituted piperazines are produced. In fact the presence of alkyl substituents in a linear reactive molecule has often been found to facilitate ring closure.

While the foregoing are illustrative of substituted piperazines readily producible from available materials, it will be appreciated that numerous other ethylene oxides may be prepared. While it is desirable to use a symmetrical ethylene diamine, i. e., one which has identical substituents on the two carbon atoms bearing amino groups, when the oxide reactant is unsymmetrical, this is not absolutely essential.

As hereinbefore pointed out, the basic reaction underlying the invention is one of ring closure accompanied by a splitting off of water. The reaction is effected in the presence of a suitable catalyst under appropriate conditions of temperature and pressure.

The following are representative of catalysts which are operative for carrying out the process: The metals of group III, group VIII, and subgroup B in groups I and II of the periodic table (with the exception of mercury) and their oxides, as well as the oxides of the elements below carbon in group IV of the periodic table.

It is to be understood that any form of the element or any compound which yields one of the above enumerated catalysts under the reaction conditions which prevail in carrying out the process may be used in place of the particular metal oxide or metal enumerated as effective as a catalyst for the reaction since in such instances the catalyst is, so to speak, produced in situ.

The catalysts are preferably employed in finely divided form and may be deposited upon a porous material, such, for example, as diatomaceous earth or activated charcoal, although they are frequently employed in the form of a suspension in the reactant or the reactant and a suitable diluent. In some instances it is found desirable to employ a mixed catalyst, such, for example, as copper chromite, rather than copper oxide for the reason that the mixed catalyst is somewhat more stable than the simple oxide. Furthermore, mixed catalysts are often more readily obtainable in the desired finely divided state.

Of the above catalysts, we have found Raney nickel, copper chromite, cupric oxide, Activated Alumina, reduced iron, and silica gel to be particularly effective, and we, therefore, give them as our preferred catalysts.

When employing such catalysts as silica gel and Activated Alumina, it is advantageous to prepare them by methods designed to yield catalytic material. Catalysts so prepared often contain a small amount of combined water. Thus silica gel, which consists mainly of silicon dioxide, is superior to pure silicon dioxide as a catalyst in carrying out the instant process. However, since silica gel is a form of silicon dioxide, it is intended to be included in the classification of catalysts as set forth above.

It has been found desirable to employ a diluent for the particular reactants used in the process. The function of the diluent is primarily to reduce the viscosity of the reactant and to facilitate contact thereof with the catalyst. The catalyst is usually introduced to the diluted reactant with stirring so as to form a suspension and is maintained in suspension by mild agitation throughout the process. The diluent must, of course, be one which is capable of reducing the viscosity of the reactant and which is inert to the desired reaction under the conditions of operation, and it must have an appropriate boiling range. The diluent may, therefore, vary, depending upon whether the process is conducted under atmospheric pressure or under superatmospheric pressure and likewise depending upon the character of the product to be produced, that is, whether anhydrous or hydrated.

When operating under a superatmospheric pressure of the order of 500 pounds per square inch, dioxane has been found to be a very advantageous diluent, particularly because it forms a low-boiling azeotropic mixture with the water released from the reactant during the process and facilitates the removal of the water from the reaction product, enabling the production of anhydrous piperazine. Other exemplary low-boiling diluents are the following:

Tetramethylene oxide, B. P. 65° C.
Ethylene glycol dimethyl ether, B. P. 82–3° C.
Diethylene glycol dimethyl ether, B. P. 160° C.

When operating at low pressures of the order of atmospheric pressure and in the production of a hydrated product, higher boiling diluents may be employed, and it is preferred that they boil within the range of 175° C. to 300° C. They must, of course, likewise be inert to the desired reaction under the conditions of operation. Representative diluents for use under low pressures are the following:

Diethylene glycol diethyl ether (diethyl carbitol), B. P. 188° C.
Tetraethylene glycol dimethyl ether, B. P. 276° C.
Tetraethylene glycol diethyl ether, B. P. 132–4° C./4 mm.

While the employment of a diluent is desirable and is believed to minimize side reactions, it is not essential to the attainment of the ring closure reaction of the invention.

The process may be conducted either batchwise or continuously, and to facilitate an understanding of the invention, we illustrate diagrammatically one suitable apparatus for carrying out the invention. In the accompanying drawing there is shown in side elevation an apparatus suitable for batchwise practice of the process.

Referring to the drawing, there is disclosed a battery of suitable reaction chambers at 1 and 2. It is to be understood that any suitable number of such reaction chambers may be employed. These reaction chambers 1 and 2 are arranged in parallel. The charging material for the process, which constitutes a suspension of the selected catalyst in either the diluted or undiluted reactant, is supplied through the line 3 and passed either through line 4 and valve 5 to reaction chamber 1 or, alternatively, through line 6 and valve 7 to reaction chamber 2. The reaction chambers are suitably heated either by being disposed in a suitable furnace or through the medium of electrical resistance elements (not shown) so as to maintain the required temperature conditions for the reaction.

Each reaction chamber is additionally provided with an appropriate agitator which may take the form of a conventional motor-driven bladed stirrer or rocking device. When the charge has been supplied to the reaction chamber, the same is closed off and the charge is heated to the required temperature and maintained at such temperature with agitation for a time period appropriate for the particular reactant and catalyst being employed.

When a superatmospheric pressure is imposed, it may be provided by introducing to the reaction chamber containing the charging material an inert gas such as nitrogen or hydrogen, and it is to be understood that suitable connections are provided for this purpose and that the reaction chambers are constructed to be operated under appropriate superatmospheric pressure conditions.

The time period of the reaction will vary, depending upon the particular reactant, the catalyst, and the temperature and pressure conditions employed. However, a period of around three hours has been found adequate for most operations.

When the reaction has proceeded to the desired point, the reaction mixture is drawn off from the reaction chamber 1 through valve 8 and line 9 or, alternatively, from reaction chamber 2 through valve 10, and in either event passes through line 11 into a suitable filter 12 wherein the suspended catalyst is separated from the reaction mixture. From the filter 12 the filtrate passes through line 13 and valve 14 into distillation chamber 15. The chamber 15 may be heated to the requisite temperature by any suitable means, for example, through the medium of appropriate electrical resistance elements.

Vapors released from the reaction mixture, which now contains the water given up as a result of the reaction which has occurred in the reaction chamber, pass from distillation chamber 15 into the fractionating column 16 wherein an appropriate reflux ratio is maintained to facilitate separation of the components of the reaction mixture. For example, when dioxane is employed as the diluent, it forms, together with the water released during the reaction, an azeotropic mixture which boils at approximately 87° C.

By suitable control of the fractionating column 16 during the initial period of distillation of the batch reaction mixture, the azeotropic mixture may be effectively separated from the reaction product and residual reactant material. From reflux column 16 the vapors pass via line 17 to condenser 18 from which the distillate may be in whole or in part drawn off through the line 19 controlled by the valve 20 or in part recycled to the top of the fractionating tower 16 through line 21 controlled by valve 22.

The process is sometimes accompanied by the formation of small amounts of ammonia, and this may be vented from the vapor line 17 through a suitable cooler 23 which permits the ammonia gas to pass out via line 24 and valve 25. Toward the end of the distillation operation, when the product is being taken overhead, it is sometimes desirable to maintain a moderate vacuum on the distillation system. This may be done by drawing a suitable vacuum on the line 26 controlled by valve 27.

The residual reactant is withdrawn from the distillation vessel 15 through line 28 controlled by valve 29.

In some instances, more particularly when the diluent is of a high boiling character and the piperazine is taken overhead from the distillation system in admixture with water, such admixture may be passed through the line 30 controlled by the valve 31 into the dehydrating tower 32. It will be borne in mind that when the piperazine is being distilled over from the distillation vessel 15, the condenser 18 will at all times be maintained at a temperature slightly above the melting point of piperazine, i. e., at a temperature of approximately 110° C. There is introduced to the dehydrating column 32, through the line 33 controlled by the valve 34, a suitable dehydrating agent, such, for example, as benzene. The tower 32 is appropriately heated as by a steam coil 35. The benzene and water form a low-boiling azeotropic mixture in the dehydrating column 32 which may be fractionated from the higher boiling benzene and piperazine.

The benzene and water vapors pass out from the tower 32 through line 36, and any ammonia which has been carried over with the piperazine and water mixture may be vented through the cooler 37, line 38, and valve 39. After being condensed in condenser 40, the condensed benzene and water vapors pass into an appropriate separator 41, from the bottom of which the water is withdrawn through line 42 and valve 43, from the top of which the benzene may be recycled through line 44 back to the top of the dehydrating column 32.

The operation of the dehydrating column 32 may be adjusted to yield pure anhydrous piperazine or any desired concentration of piperazine in benzene as the product which is withdrawn through line 45 controlled by valve 46. In the event the piperazine is drawn off in solution in benzene from the bottom of tower 32, pure piperazine may be recovered by crystallization on cooling. The amount of benzene in the column remains nearly constant; and in the event the piperazine is drawn off in solution in benzene, the loss of benzene is compensated by addition of benzene, suitably by means of line 38. The column operation is suitably controlled by varying the heat added by coil 35 and by adjusting the rate of withdrawal of liquid through line 45.

Assuming that dioxane is used as the diluent and that anhydrous piperazine is the desired reaction product, the reaction mixture is treated in the distillation system by initially maintaining the same at an appropriate temperature to drive off the dioxane-water azeotropic mixture, the refluxing column 16 being so controlled as to reflux back materials of higher boiling point. The dioxane-water azeotropic mixture is condensed in condenser 18 and drawn off through line 19, from which it may be appropriately treated to effect separation of the water from the dioxane and the dioxane recovered for reuse.

After the dioxane-water azeotropic mixture has been separated from the reaction mixture, the temperature in distillation chamber 15 is elevated so as to drive off the pure dioxane diluent which in like manner is drawn off through line 19 and recovered for reuse. When the dioxane diluent has been separated from the reaction mixture, the temperature is again elevated so as to drive off from the residual reactant the pure anhydrous piperazine which in like manner is drawn off through the line 19 and recovered as the desired product of the process. The residual reactant is then drawn off from the distillation chamber 15. Any unreacted amino-alcohol or substituted amino-alcohol may be recovered for reuse in the process.

In those instances where a high-boiling diluent is employed, such, for example, as diethyl carbitol which boils at 188° C., the operation of the distillation system is obviously somewhat different in that instead of first distilling over an azeotropic mixture followed by taking overhead the diluent and finally the piperazine, the distillation system is operated so as to take overhead the mixture of piperazine and water. In this instance, instead of taking off the respective materials direct from condenser 18 through line 19, the mixture is passed through line 30 to the dehydrating column 32 where separation is effected as hereinbefore described.

The temperature at which the reaction may be effected will vary depending upon the particular reactant and catalyst employed. Generally speaking, the temperature should lie within the range of from 175° C. to 325° C. with the preferable range lying between 200° C. and 300° C. The particular temperature within the stated range should be so selected as to keep undesirable side reactions and decompositions of the reactant at a minimum.

While the foregoing constitutes a general illustration of the adaptation of the process, it is desired to point out that in some instances, notably where the reaction is effected at low pressures of the order of atmospheric pressure and with relatively high-boiling diluents, it is advantageous to conduct the reaction with refluxing.

The following constitute illustrative examples of the process:

*Example I*

In this operation 150 parts of hydroxyethyl ethylenediamine, 200 parts of dioxane and 5 parts of palladium on activated charcoal catalyst were prepared as a suspension and heated together in a closed reaction vessel to a temperature of 225° C. The mixture was mildly agitated for six and one-half hours, during which time the temperature gradually rose, reaching a maximum of 246° C. at the time agitation was stopped and heating discontinued. The product was then cooled and removed from the reaction vessel. The catalyst was separated from the reaction mixture by filtration. The reaction mixture was then separated by fractional distillation. A yield of 13% of solid piperazine was obtained based on the hydroxyethyl ethylenediamine used. The product boiled within the range of 140° to 150° C. By distillation of the residual reactant at reduced pressure, 49% of the hydroxyethyl ethylenediamine used as a starting material was recovered.

*Example II*

In this operation 85 parts of hydroxyethyl ethylenediamine was mixed with 400 parts of dioxane and 10 parts of Raney nickel forming a suspension in the reaction vessel. The suspension thus formed was heated in a closed reaction vessel at a temperature of 200° C. and mildly agitated while maintained at a temperature within the range of 195° to 205° C. for three hours. The material was then cooled to approximately room temperature and the reaction vessel opened, at which time some ammonia vapor escaped. The reaction mixture was freed from its contained catalyst by filtration and then fractionally distilled. A yield of 42% by weight of solid piperazine based on the hydroxyethyl ethylenediamine used was obtained. The product boiled within the range of 140° to 150° C. This constituted a yield of approximately 51% of the theoretical.

*Example III*

In this operation 150 parts of hydroxyethyl ethylenediamine was mixed with 200 parts of dioxane and 15 parts of Activated Alumina and agitated in a closed vessel at a temperature of approximately 300° C. for three hours. The reaction mixture was then cooled to room temperature, removed from the reaction vessel and filtered to separate the catalyst. The catalyst was rinsed with additional dioxane which was combined with the filtrate. The reaction mixture representing the filtrate was then subjected to fractional distillation. 25 parts of piperazine, representing a yield of 20% of the theoretical, was obtained. The residue, on distillation at reduced pressure, yielded 82 parts of hydroxyethyl ethylenediamine.

Example IV

In this operation 279 parts of hydroxyethyl ethylenediamine and 30 parts of silica gel were mixed without a diluent and introduced into a closed reaction vessel. The mixture was heated to approximately 300° C. and agitated while maintained at this temperature for three hours. The reaction mixture was then cooled, the reaction chamber opened and the reaction mixture removed and filtered to separate the catalyst. The catalyst was washed with a quantity of dioxane which was combined with the reaction mixture, which was then separated by distillation, yielding 40 parts of pure piperazine. This constituted a yield of 17.4% of the theoretical. By distillation of the residue, there was recovered 150 parts of hydroxyethyl ethylenediamine.

Example V

In this operation 150 parts of hydroxyethyl ethylenediamine was distilled and refluxed with 5 parts of Raney nickel in the absence of a diluent. The evolved vapors were passed through a short reflux column before condensation. The conditions were maintained such that a distillate, boiling at 100° to 140° C., were collected over a period of two hours and until no more such low boiling distillate appeared. An adequate reflux ratio for this purpose was maintained during the distillation. The distillate, representing 48 parts of a semi-solid material, consisted mainly of piperazine and water. The yield of piperazine was 31.6% of the theoretical.

Example VI

In this operation 156 parts of hydroxyethyl ethylenediamine was mixed with 1000 parts of dioxane and 60 parts of copper chromite catalyst. An inert atmosphere was used to give a pressure of 500 lbs. per sq. in. of nitrogen, cold. The mixture was agitated in a closed reaction vessel for a period of three hours while maintained at a temperature of approximately 275° C. The reaction mixture was filtered to separate the catalyst and then fractionally distilled. The piperazine product represented a 45% yield of the theoretical.

Example VII

In this operation 150 parts of hydroxyethyl ethylenediamine was distilled and refluxed with 5 parts of Raney nickel as a catalyst in the absence of a diluent using a reflux column with an outlet temperature of approximately 140° C. From the distillate collected during a period of two and one-quarter hours a 30% yield of piperazine was obtained.

Example VIII

In this operation 150 parts of hydroxyethyl ethylenediamine was refluxed with 150 parts of diethyl carbitol and 5 parts of Raney nickel catalyst employing a reflux column having an outlet temperature held within the range of 140° to 150° C. A yield of 34% piperazine was obtained from the distillate collected over a period of several hours.

Example IX

In this operation 156 parts of hydroxyethyl ethylenediamine was mixed with 1000 parts of dioxane and 30 parts of Raney nickel catalyst. The mixture was agitated in a closed reaction chamber for a period of three hours while maintained at a temperature of approximately 200° C. A superatmospheric pressure of 500 lbs. per sq. in. of nitrogen was employed in this operation. There was recovered from the reaction mixture piperazine representing a 50% yield of the theoretical.

Example X

In this operation 59 parts of N-(2-hydroxypropyl)-ethylenediamine was mixed with 350 parts of dioxane and 10 parts of copper chromite catalyst. The mixture was subjected to an atmosphere of nitrogen at a pressure of 500 lbs. per sq. in. in a closed reaction chamber. The mixture was agitated for a period of three hours while maintained at a temperature of approximately 275° C. The contents of the reaction chamber were cooled and the nitrogen gas released. The reaction mixture was then filtered to separate the catalyst, following which it was fractionally distilled. The product represented pure 2-methylpiperazine having a boiling point of 152.8° C. This product was produced in a yield representing 50% of the theoretical.

Example XI

In this operation 108.5 parts of N-(2-hydroxy-2-phenylethyl)-ethylenediamine, 300 parts of dioxane and 20 parts of Raney nickel catalyst were charged through a closed reaction vessel. The mixture was heated to a temperature of 220° C. and agitated for a period of three hours while maintained at a temperature within the range of 215° to 225° C. The reaction mixture was removed, filtered and fractionally distilled. 32 parts of 2-phenylpiperazine were recovered. This product boiled within the range of 130 to 145° C., the principal portion distilling at 138° C. The yield represented 33% of the theoretical.

Other substituted piperazines are produced through the employment of procedure comparable to that set forth in the foregoing examples in yields generally analogous to those given for the production of unsubstituted piperazine, 2-methylpiperazine and 2-phenylpiperazine.

The foregoing description and examples are given by way of explanation and exemplification of the invention and are not to be construed in limitation thereof, the scope of the invention being that defined in the following claims.

Having thus described our invention, we claim:

1. A process for synthesizing piperazine comprising mixing a hydroxyethyl ethylenediamine free base with a diluent inert to the desired reaction and capable of forming a low-boiling azeotropic mixture with water, and a catalyst selected from the class consisting of the metals of group III, group VIII, and sub-group B in groups I and II of the periodic table, except mercury, and their oxides and the oxides of elements below carbon in group IV of the periodic table, subjecting said mixture to a temperature within the range from 175° C. to 325° C. to effect ring closure of said hydroxyethyl ethylenediamine accompanied by a splitting off of water, removing the water-diluent mixture by fractionation and recovering the piperazine in substantially anhydrous form.

2. A process of synthesizing a hydrocarbon substituted piperazine which comprises subjecting a free base of the general formula:

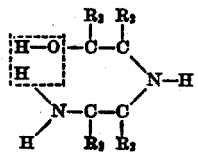

in which R represents a hydrocarbon radical to a temperature within the range of from 175° C. to 325° C. in the presence of a solvent forming a low-boiling azeotrope with water and a catalyst selected from the group consisting of the metals of group III, group VIII, and sub-group B in groups I and II of the periodic table, except mercury, and their oxides and the oxides of elements below carbon in group IV of the periodic table, to effect ring closure and the splitting off of water, removing the azeotropic mixture by fractionation, and then recovering the piperazine in substantially anhydrous form.

3. A process of synthesizing heterocyclic compounds comprising subjecting a free base conforming to the general formula:

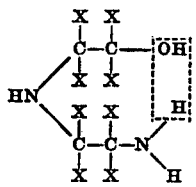

wherein X is selected from the group consisting of hydrogen, alkyl, aryl, aralkyl, and alkaryl, to a temperature within the range of from 175° C. to 325° C. in the presence of dioxane and a catalyst selected from the class consisting of the metals of group III, group VIII, and subgroup B in groups I and II of the periodic table, except mercury, and their oxides and the oxides of elements below carbon in group IV of the periodic table, and then removing the water-dioxane mixture from the heterocyclic compound by fractionation.

4. A process of synthesizing heterocyclic compounds comprising mixing a free base of the general formula:

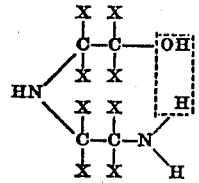

wherein X is selected from the group consisting of hydrogen, alkyl, aryl, aralkyl, and alkaryl, with diethyl carbitol in the presence of a catalyst selected from the class consisting of the metals of group III, group VIII, and sub-group B in groups I and II of the periodic table, except mercury, and their oxides and the oxides of elements below carbon in group IV of the periodic table, and subjecting the mixture to a temperature in the range within from 175° C. to 325° C. to effect ring closure with the splitting off of water to form a readily separable azeotropic mixture with the diethyl carbitol.

CASH B. POLLARD.
LELAND J. KITCHEN.